United States Patent [19]

Yoshihara et al.

[11] 4,022,808

[45] May 10, 1977

[54] PROCESS FOR THE PRODUCTION OF ALKYLENE GLYCOL ETHER OF ORGANIC CARBOXYLIC ACID

[75] Inventors: Hiroshi Yoshihara; Takashi Tobita; Ryoichi Tomizawa, all of Ichihara; Kunio Ishikawa, Chiba, all of Japan

[73] Assignee: Nippon Soda Company Limited, Tokyo, Japan

[22] Filed: Nov. 15, 1974

[21] Appl. No.: 524,156

[30] Foreign Application Priority Data

Nov. 19, 1973 Japan .............................. 48-129937
Nov. 19, 1973 Japan .............................. 48-129938

[52] U.S. Cl. .............................. 260/410.6; 260/491; 260/476 R; 260/468 R; 260/485 R; 260/486 R; 260/475 R; 260/496

[51] Int. Cl.² .......................... C09F 5/08; C09F 7/10

[58] Field of Search ............ 260/491, 476 R, 410.6, 260/496, 468 R, 485 R, 486 R, 475 R

[56] References Cited

UNITED STATES PATENTS

| | | | |
|---|---|---|---|
| 2,542,693 | 2/1951 | Nevison | 260/410.6 |
| 2,910,490 | 10/1969 | Malkemur | 260/410.6 |
| 3,040,076 | 6/1962 | Seidel | 260/410.6 X |
| 3,255,236 | 6/1966 | Selwitz | 260/410.6 X |
| 3,341,570 | 9/1967 | Barie | 260/410.6 X |
| 3,418,359 | 12/1968 | Barie | 260/410.6 X |

*Primary Examiner*—Winston A. Douglas
*Assistant Examiner*—John F. Niebling
*Attorney, Agent, or Firm*—George B. Oujevolk

[57] ABSTRACT

A process for the production of an alkylene glycol ether ester of organic acid which comprises reacting an alkylene oxide and an ester of organic carboxylic acid by using a catalytic amount of a basic catalyst selected from the group of halogenides consisting of zinc, aluminum, titanium, tin and iron, and organometallic compounds of zinc, aluminum, titanium, tin and iron.

3 Claims, No Drawings

PROCESS FOR THE PRODUCTION OF ALKYLENE GLYCOL ETHER OF ORGANIC CARBOXYLIC ACID compounds containing Vb elements of nitrogen, phosphorus, arsenic antimony, bismuth.

The reaction of alkylene oxide and ester of organic carboxylic is shown as follows and poly or mono-alkylene glycol ether ester of organic carboxylic acid is obtained.

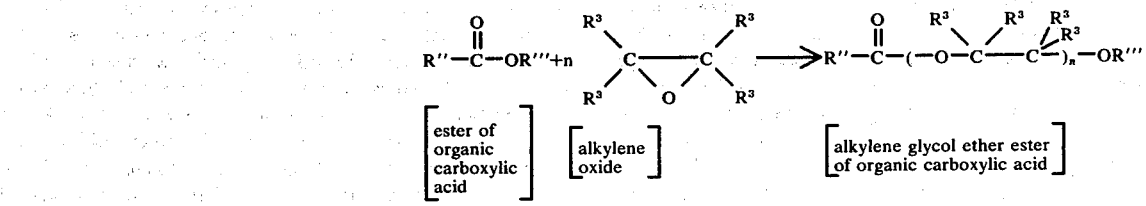

(Wherein, R'' represents simultaneously the same or different groups of substituted or non-substituted hydrocarbon groups having 1 to 20 carbon atoms or a hydrogen atom, R''' represents simultaneously the same or different groups of substituted or non-substituted hydrocarbons having 1 to 20 carbon atoms, $R^3$ represents simultaneously the same or different groups of substituted or non-substituted hydrocarbons having 1 to 10 carbon atom or a hydrogen atom).

DETAILED EXPLANATION OF THE INVENTION

This invention relates to a novel process for production of alkylene glycol ether ester of organic carboxylic acid, and more particularly relates to a novel process for the production of a mono or poly-alkylene glycol ether ester of organic carboxylic acid from organic carboxylic acid ester and alkylene oxide by the direct reaction of alkylene oxide with an organic carobxylic acid ester.

It is known that alkylene glycol ether ester can not be produced by the direct reaction of alkylene oxide and organic carboxylic acid ester. So, alkylene glycol ether ester of organic carboxylic acid is produced by esterification of alkylene glycol mono-alkyl ether with organic carboxylic acid, or is produced by ester exchange reaction between ester of organic carboxylic acid and alkylene glycol alkyl ester. As an improved process of these two step reactions, Japanese Pat. No. SHO45-20286 describes a process in which the addition reaction of alkylene oxide and ester exchange reaction take place by adding alkylene oxide into a mixture of ester of organic carboxylic acid and alcohol. However, in the process it takes a long time to complete the reaction and the separation of the subject material is very troublesome.

Accordingly, it is an object of the present invention to provide a process in which alkylene glycol ether ester of organic carboxylic acid is produced in a one step reaction from an ester of an organic carboxylic acid and an alkylene oxide.

It is a further object of the invention to provide a process in which alkylene glycol ether ester of an organic carboxylic acid is produced in high yield.

It is also an object of the invention to provide a process in which an alkylene glycol ether ester of the organic carboxylic acid can be easily separated from reaction mixture.

We have found that some compounds containing Al, Ti, Fe, Zn or Sn provide a catalytic action for the addition reaction of alkylene oxide to alkylene glycol ether ester of organic carboxylic acid and further some compounds containing group Vb elements have a catalytic action as a promoter of the compounds of Al, Ti, Fe, Zn or Sn.

In the invention, for the preparation of alkylene glycol ether ester of organic carboxylic acid, alkylene oxide is reacted with ester or organic carboxylic acid at about 50 – 300° C using at least a basic catalyst selected from halogenated metallic compounds or organometallic compounds of zinc (Zn), aluminum (Al), Titanium (Ti), Tin (Sn) and iron (Fe), when the basic catalyst is used with at least cocatalyst of a group selected from In the invention various kind of alkylene oxides can be used. As the most popular alkylene oxides, for example, one or more of the following ethylene oxide, propylene oxide, iso-butylene oxide, 1,2-butylene oxide, 2,3-butylene oxide, stylene oxide are employed and the corresponding alkylene glycol ether ester of organic carboxylic acid is obtained.

As an ester of organic carboxylic acid in the invention, various kinds of organic carboxylic acids can be employed and ordinarily it is preferable when R'' and R''' represent simultaneously the same or different groups of alkyl, cycloalkyl, alkyl, aryl and arylalkyl components.

Typical examples of ester of organic carboxylic acid are listed as follows: methyl formate, ethyl formate, propyl formate, amyl formate, octyl formate, decyl formate, dodecyl formate, tetradecyl formate, hexadecyl formate, octadecyl formate, methyl acetate, ethyl acetate, vinyl acetate, propyl acetate, isopropyl acetate, butyl acetate, hexyl acetate, octyl acetate, decyl acetate, undecyl acetate, tridecyl acetate, pentadecyl acetate, heptadecyl acetate, methyl propionate, ethyl propionate, propyl propionate, decyl propionate, amyl butylate, heptyl butylate, decyl butylate, butyl valeriate, hexyl valeriate, octyl valeriate, ethyl cyclopenta carboxylate, methyl caproate, ethyl caproate, vinyl caproate, propyl caproate allyl caproate, butyl caproate, octyl caproate, dodecyl caproate, pentadecyl caproate, ethyl cyclohexacarboxylate, methyl enanthoate, butyl enanthoate, octyl enanthoate, methyl benzoate, ethyl benzoate, isopropyl benzoate, n-butyl benzoate, isobutyl benzoate, isoamyl benzoate, phenyl benzoate, methyl caprylate, propyl caprylate, amyl caprylate, heptyl caprylate, ethyl perlargonate, vinyl perlargonate, methyl caprate, vinyl caprate, isopropyl caprate, heptyl caprate, methyl laurate, ethyl laurate, vinyl laurate, propyl laurate, octyl laurate, dodecyllaurate, octadecyl laurate, ethyl myristate, butyl myristate, methyl palmitate, ethyl palmitate, amyl palmitate, ethyl stearate, octyl stearate, hexadecyl stearate, methyl oleate, ethyl oleate, propyl oleate, isopropyl oleate, isobutyl oleate, isoamyl oleate, oleyl oleate, methyl ricinoleate, ethyl ricinoleate, propyl ricinoleate, heptyl ricinoleate.

Further, an ester of organic carboxylic acid having R''' which is a substituted alkyl group with a hydroxyl group or hydroxyl alkoxyl group can be employed. For example, esters which are produced with esterification of organic carboxylic acid, such as formic acid, acetic acid, propionic acid, butylic acid, valeric acid, caproic acid, cyclohexyl carboxylic acid, enanthic acid, benzoic acid, caprylic acid, pelargonic acid, capric acid, lauric acid, tridecyl carboxylic acid, palmitic acid, stearic acid, oleic acid, ricinoleic acid, and poly-hydroxyl alkylene or polyalkylene glycol such as ethylene glycol, propylene glycol, butylene glycol, hexylene glycol, glycerine, pentaerythritol, sorbitol, can be listed. Further more such esters of dicarboxylic acid such as oxalic acid, citric acid, terephtharic acid may be employed.

As basic catalysts, halogenated or organometallic compounds of zinc, aluminum, titanium, tin or iron which have carbon atom bonding with these metallic atoms directly or through an intermediating atom of oxygen, sulfur nitrogen or phosphorus. Typical compounds of halogenated or organometallic compounds can be represented by a formula (1) MQN wherein M is an atom selected from the group of Zn, Al, Ti, Sn and Fe, n is the valency of M and Q is the same or different groups of halogen atoms, R, OR, SR, $NR_2$ and $PR_2$, (in which R represents the same or different hydrocarbon group having 1 – 20 carbon atoms and having or not having substituted groups, or hydrogen atoms. When M is Zn, ordinarily n is 2 and Q is a halogen atom, R or OR. Particularly chlorine, bromine, iodine or fluorine is preferable as the halogen atom. As a group of R, alkyl, cycloalkyl, allyl aryl or arylalkyl, such as, methyl, ethyl, vinyl, propyl, isopropyl, butyl, isobutyl, hexyl, octyl, decyl, stearyl, phenyl, naphthyl, benzyl, toluyl, cyclopentyl, cyclohexyl, cyclopentadiphenyl or derivatives of thereof are chosen.

Following are typical examples of zinc compounds and organozinc compounds; (Q is halogen and R) iodomethyl zinc iodide, ethyl zinc chloride, ethylzinciodide, isopropyl zinc iodide, allylzinc bromide, crotyl zinc bromide, phenyl zinc iodide (Q is R) dimethylzinc, diethyl zinc, divinyl zinc, ethylpropyl zinc, dipropyl zinc, diisopropyl zinc, ethylisopropyl zinc, ethylisobutyl zinc, ethylcyclopentadienyl zinc. propylidobutyl zinc, dibutyl zinc, diisobutyl zinc, di-secondary-butyl zinc, isobutylisoamyl zinc, dicyclopentadienyl zinc, diisoamyl zinc, phenylcyclopenta-dienyl zinc, bis-chlorophenyl zinc, diphenyl zinc, diboluyl zinc, diheptyl zinc, bis-2-phenylpropyl zinc, di-$\beta$-naphtyl zinc, (Q is R and OR) (Q is OR) methylethoxy zinc, ethylisopropoxy zinc. In these examples, organozinc compound having two groups of R is most preferable.

When M is Al, n is 3 and Q is the same or different atoms or groups selected from halogen atom, R, OR, SR, $NR_2$ and $PR_2$. Particularly chlorine, bromine, iodine or fluorine is preferable as the halogen atom. As group of R, alkyl, cycloalkyl, allyl, aryl or arylalkyl, such as, methyl, ethyl, propyl, isopropyl, butyl, isobuthyl, hexyl, octyl, decyl, dodecyl, stearyl, phenyl, naphthyl, benzyl, toluyl, cyclopentyl, cyclohexyl or derivatives thereof are preferably chosen.

The following are typical examples of aluminum compounds, aluminum chloride, aluminum iodide, aluminum fluoride, aluminum bromide, (Q is halogen and R) methyl aluminum dichloride, ethyl aluminum dichloride, isobutyl aluminum dichloride, ethyl aluminum dibromide, allyl aluminum dichloride, vinyl aluminum dichloride, methyl aluminum sesquichloride, ethyl aluminum sesquichloride, methyl aluminum sesquibromide, ethyl aluminum sesquiiodide, isobutyl aluminum sesquichloride, hexyl aluminum sesquichloride, cyclohexyl aluminum sesquichloride, phenyl aluminum dichloride, phenyl aluminum dibromide, dimethyl aluminum bromide, diethyl aluminum chloride, diethyl aluminum bromide, diethyl aluminum iodide, diisobutyl aluminum chloride, ethylphenyl aluminum chloride, dodecyl aluminum chloride, diphenyl aluminum chloride, (Q is R) aluminum hydride, trimethyl aluminum, triethyl aluminum, triisopropyl aluminum, tri-n-butyl aluminum, triphenyl aluminum, tri-n-hexyl aluminum, tri-benzyl aluminum, trioctyl aluminum, trichloromethyl aluminum, tri-p-toluyl aluminum, tridodecyl aluminum, methyldiethyl aluminum, ethyldihexyl aluminum, diethyl aluminum hydride, diisobutyl aluminum hydride, (Q is OR) tri methoxy aluminum, triethyory aluminum, triisopropoxy aluminum, tributoxy aluminum, (Q is $NR_2$) tri(ethylamino) aluminum, tri(diethylamino) aluminum, tri(isopropylamino) aluminum, tri(diisopropylamino) aluminum, tri(butylamino) aluminum, tri(dibutylamino) aluminum, tri (hexylamino) aluminum, tri(cyclohexylamino) aluminum, trianilino aluminum, tri(N-ethylanilino) aluminum, (Q is SR) aluminum trimethylmercaptide, aluminum triethylmercaptide, aluminum tripropylmercaptide, aluminum tributylmercaptide, aluminum triphenylmercaptide, (Q is $PR_2$) aluminum trimethylphosphide, aluminum triethylphosphide, aluminum tri(isopropyl-phosphide), aluminum tri(butylphosphide),aluminum tri(benzylphosphide), aluminum tri (phenylphosphide), aluminum tri(diethylphosphide), aluminum tri (methylphenylphosphide), (Q is halogen and OR) methoxy aluminum dichloride, ethoxy aluminum dichloride, ethoxy aluminum dibromide, isopropoxy aluminum dichloride, butoxy aluminum dichloride, phenoxy aluminum dichloride, dimethoxy aluminum chloride, diethoxy aluminum chloride, diethoxy aluminum bromide, diphenoxy aluminum chloride, (Q is R and OR) methoxydimethyl aluminum, ethoxy diethyl aluminum, phenoxy diethyl aluminum, isopropoxydiethyl aluminum, methoxy diisobutyl aluminum, ethyldiethoxy aluminum, ethyldiphenoxy aluminum, isobutyldiethoxy aluminum, (Q is halogen and SR) methylmercapto aluminum dichloride, ethylmercapto aluminum dichloride, ethylmercapto aluminum dibromide, isopropylmercapto aluminum dichloride, phenylmercapto aluminum dichloride, diethylmercapto aluminum chloride, diethylmercapto aluminum bromide, diisobutylmercapto aluminum chloride, diphenylmercapto aluminum chloride (Q is R and SR) diethyl aluminum methylmercaptide, diethyl aluminum ethylmercaptide, diethyl aluminum isobutylmercaptide, diethyl aluminum cyclohexyl mercaptide, diethyl aluminum phenylmercaptide, diethyl aluminum laurylmercaptide, ethyl aluminum diethylmercaptide, ethyl aluminum diphenylmercaptide (Q is halogen and $NR_2$) methylamino aluminum dichloride, dimethylamino aluminum dichloride, ethylamino aluminum dichloride, ethylamino aluminum dichloride, diethylamino aluminum dibromide, isopropylamino aluminum dichloride, cyclohexyl amine aluminum chloride, laurylamino dichloride, anilino aluminum dichloride, N-ethylanilino aluminum dichloride, benzylamino aluminum dichloride, toluylamino aluminum dichloride, bis (dimethylamino) aluminum chloride, bis (diethylamino) aluminum chloride, dianilino aluminum chloride, (Q is R and NR$_2$) diethyl aluminum methylamide, diethyl aluminum ethylamide, diethyl aluminum butylamide, diethylaluminum cyclohexyamide, diethyl aluminum phenylamide, diethyl aluminum laurylamide, diethyl aluminum benzylamide, diethyl aluminum diethyl amide, diethyl aluminum diphenylamide, ethyl aluminum bis (diethylamide), ethyl aluminum bis (N-methyltoluylamide) (Q is halogen and PR$_2$) methylphosphino aluminum dichloride, ethylphosphino aluminum chloride, butylphosphino aluminum dichloride, cyclohexylphosphino aluminum dichloride, dimethylphosphino aluminum dibromide, diethylphosphino aluminum dibromide, phosphino aluminum dichloride, phenylphosphino aluminum dichloride, methylphenylphosphino aluminum dichloride, dimethylphosphino aluminum chloride, diethylphosphino aluminum chloride, dibutylphosphino aluminum chloride, diphenylphosphino aluminum chloride (These organoaluminum halogenide can be prepared by reacing the corresponding alcohol, mertaptane, amine or phosphine with alkyl aluminum halogenide by known process.) Q is R and PR$_2$) diethyl aluminum methylphosphide, diethyl aluminum ethylphosphide, diethyl aluminum butylphosphide, diethyl aluminum cyclohexyphosphide, diethyl aluminum diethylphosphide, diethyl aluminum dibutylphosphide, diethyl aluminum phenylphosphide, ethyl aluminum diethylphosphide, ethyl aluminum diphenylphosphide, ethyl aluminum bis (diethylphosphide), ethyl aluminum bis (diphenylphosphide). (These organo aluminum compounds can be prepared by reacting the corresponding alcohol, mercaptane, amine or phosphine with trialkyl aluminum) (Q is OR and SR, RO and NR$_2$, OR and PR$_2$, NR$_2$ and PR$_2$, and SR and PR$_2$) ethoxy aluminum diethylmercaptide, diethoxy aluminum ethylmercaptide ethoxy aluminum bis(diethylamide), diethoxy aluminum diethylamide, ethoxy aluminum bis(diphenyl-phosphide), diethoxy aluminum diphenyl phosphide, bis(diethylamino) aluminum ethylmercaptide, diethylamino aluminum diethylmercaptide, bis(diethylamino) aluminum diphenylphosphide, diethylamino aluminum bis (diphenylphosphide) diethylmercapto aluminum diphenylphosphide, ethylmercapto aluminum bis (diphenylphosphide) (These compounds can be prepared by reacting the corresponding alcohol, mercaptan, amine and phosphine with alkyl aluminum alkoxide, alkyl aluminum mercaptide, alkyl aluminum amide or alkyl aluminum phosphide) As organoaluminum halogenide, Q may be selected as follows; halogen, R and OR, halogen, R and SR, halogen, R and NR$_2$, halogen, R and PR$_2$, halogen, OR and NR$_2$, halogen, OR and SR, halogen, OR and PR$_2$, halogen, SR and NR$_2$, halogen, NR and PR$_2$ and halogen, SR and PR$_2$ and typical examples are as follows methylethoxy aluminum chloride, ethylisopropoxy aluminum chloride, ethylphenoxy aluminum chloride, ethylmercapto aluminum chloride, ethylmercapto aluminum chloride, ethyldiethylamino aluminum chloride, ethyldiphenylamino aluminum chloride, ethyldiethylphosphino aluminum chloride, ethyldi-phenylphosphino aluminum chloride, ethoxydiethylamino aluminum chloride, ethoxyphenylmercapto aluminum chloride, ethoxyphenylphosphino aluminum chloride, ethyl mercaptodiethylamino aluminum chloride, diethlamino diphenylmercapto aluminum chloride, ethylmercaptodiphenylphospino aluminum chloride. (These compounds can be prepared by reacting the corresponding alcohol, mercaptan, amine and phosphine with alkyl aluminum halogenide by a known process.) Further Q can be selected as follows R, OR and NR$_2$, R, OR and SR, R, OR and PR$_2$, R, NR$_2$ and SR, R, NR and PR$_2$, P, SR and PR$_2$, OR, NR$_2$ and SR, OR, NR$_2$ and PR$_2$, OR, SR and PR$_2$, NR$_2$, SR and PR$_2$, and typical examples are as follows; ethylethoxy aluminum diethyllamide ethylethoxy aluminum diphenylphosphide, ethyldiethylamino aluminum diphenyl phosphide and these compounds can be prepared from trialkyl aluminum according to a known process. Aluminum compounds are solely used as a catalyst, aluminum compounds having aluminum-oxigen, aluminumhalogen, aluminum-nitrogen or aluminum-phosphorus combination are preferably employed and more preferably aluminum compounds having aluminum-halogen, aluminum-nitrogen or aluminum-phosphorus combination are employed.

When M is titanium, ordinary n has a volence of 4 and Q is the same or different atoms or groups of halogen atoms, R or OR. Practically titanium halogenide and organo titanium halogenide can be preferably employed. As the halogen atom, chlorine, bromide iodine or fluorine are preferable and as the group for R, alkyl, cycloalkyl, aryl, allyl, arylalkyl such as methyl, ethyl, propyl, isopropyl, butyl, isobutyl, hexyl, octyl, decyl, dodecyl, stearyl, phenyl, naphthyl, benzyl, toluyl, cyclopentyl, cyclohexyl or derivatives thereof, are preferably chosen.

The following are typical examples of titanium compounds; titanium tetrachloride, titanium tetrabromide, titanium tetrafluoride, (Q is halogen and R) methyl titanium trichloride, ethyl titanium trichloride, cyclopentadienyl titanium trichloride, dimethyl titanium dichloride, diethyl titanium dichloride, (Q is halogen and OR) trimethoxy titanium chloride, triethoxy titanium chloride, triisopropoxy titanium chloride, tributoxy titanium chloride, triamyloxy titanium chloride, 2-ethyl-hexyloxy titanium chloride, triphenoxy titanium chloride, tribenzyloxy titanium chloride, tricyclohexyloxy titanium chloride, dimethoxy titanium dichloride, diethoxy titanium dichloride, dibutoxy titanium dichloride, diamyloxy titanium dichloride, di-2-ethylhexyloxy titanium dichloride, dicyclohexyloxy titanium dichloride, diphenoxy titanium dichloride, methoxy titanium trichloride, ethoxy titanium trichloride, butoxy titanium trichloride, cyclohexyloxy titanium trichloride, phenoxy titanium trichloride, benzyloxy titanium trichloride and the corresponding bromine-titanium compounds which is represented by replacing the chlorine atom with the bromine atom in said titanium-chlorine compounds.

The titanium compound is solely used as a catalyst, a titanium compound having a halogen-titanium bond is preferable and catalytic action increases according to an increase of the number of the halogen titanium bond.

When M is tin, n is 4 and Q is the same or different atoms or groups of halogen atoms, R, OR, SR, NR$_2$, PR$_2$. Particularly as a halogen atom, chlorine, bromine, iodine or fluorine is preferable and as group of R, alkyl, cycloalkyl, aryl, allyl, arylalkyl such as methyl, ethyl, propyl, isopropyl, butyl, isobutyl, hexyl, octyl, decyl, dodecyl, stearyl, phenyl, naphthyl, benzyl, toluyl cyclopentyl, cyclohexyl or derivatives thereof, are preferably chosen.

The following are typical examples of tin compounds, tin tetrachloride, tin tetrabromide, tin tetraiodide, tin tetrafluoride, (Q is halogen and R) dimethyl tin chloride, diethyl tin dichloride, di-n-propyl tin dichloride, di-n-butyl tin dichloride, diphenyl tin dichloride, ditoluyl tin dichloride, dibenzyl tin dichloride, di-1-naphthyl tin dichloride, di-1-propenyl tin dibromide, divinyl tin dichloride, bis(P-chlorophenyl) tin dichloride, (Q is halogen and R) trimethyl tin chloride, trivinyl tin chloride, triethyl tin chloride, triisopropyl tin chloride, tripropyl tin chloride, tributyl tin chloride, triisoamyl tin chloride, triphenyl tin chloride, isohexyl tin chloride, tribenzyl tin chloride, trioctyl tin chloride, ethyldimethyl tin iodide, methylethylpropyl tin iodide, butyldimethyl tin iodide, diethylisobutyl tin bromide, dibutylvinyl tin chloride, diamylmethyl tin iodide and corresponding bromine-tin compounds, iodine-tin compounds and fluorine-tin compounds which are represented by replacing the chlorine atom with the corresponding halogen atom in said chlorine-tin compounds. These compounds can be prepared by a known process and when the tin compound is solely employed as catalyst, catalytic action increases according to an increase of the number of halogen-tin bond.

When M is iron, Q is usually selected from halogens and particularly ferric chloride, ferric bromide, ferric iodide and ferric fluoride and ferric chloride is preferable.

These basic catalyst can increase their catalytic action when they are used, with one or more of catalyst of compounds containing nitrogen, phosphorus, arsenic, antimony and bismuth which make a covalent bond, co-ordinate bond or interaction with metallic atom of basic catalyst.

As cocatalyst, compounds containing row Vh elements of the periodic table such as nitrogen, phosphorus, antimony, arsenic, and bismuth and having a halogen and/or carbon atom directly combining with nitrogen, arsenic, phosphorus, antimony or bismutch is employed and the compound is represented with a following formula (2);

$$AR^2{}_3 \ldots \quad (2)$$

wherein A is an atom selected from a row Vh element of the periodic table, $R^2$ is the same or different atoms or groups of halogens, hydrogen or substituted or non-substituted hydrocarbon group having 1 to 20 carbon atom, two of $R^2$ may make one cyclic hydrocarbon and at least one of $R^2$ is the hydrocarbon group at a same time. Ordinarily $R^2$ is selected from halogen such as chlorine, briomine, iodine, fluorine alkyl, and hydrocarbon group such as allyl, aryl or arylalkyl. Typical examples of hydrocarbon group can be listed as follows; methyl, ethyl, propyl, butyl, hexyl, octyl, decyl, dodecyl, tetradecyl, stearyl, phenyl, toluyl, benzyl, naphthyl, cyclohexyl.

When A is nitrogen, a primary, secondary or tertiary mono- or poly-amine can be employed. Practically, methyl amine, dimethyl amine, trimethyl amine, ethyl amine, diethyl amine, triethyl amine, isopropyl amine triisopropyl amine, hexyl amine, cyclohexylamine lauryl amine aniline, N-methylaniline, N,N-methylethyl aniline, diphenyl amine, α or β-aminonaphthalene, benzyl amine, toluidine, piperidine, pyridine, morpholine, N-methyltoluidine, piperadine, triethylenediamine, quinoline, oxazine, quinuclidine can be employed and amines having saturated straight carbon chain or cycloalkyl chain are preferable.

When A is phosphorous, a primary secondary or tertiarly mono- or poly-phosphine can be employed. Practically, methyl phosphine, ethyl phosphine, propyl phosphine, butyl phosphine, pentyl phosphine, cyclohexyl phosphine, benzyl phosphine, dimethyl phosphine, diethyl phosphine, diisopropyl phosphine, trimethyl phosphine, triethyl phosphine, ethyldimethyl phosphine, triisopropyl phosphine, trivinyl phophine, phenyl phosphine, diphenyl phosphine, triphenyl phosphine, allyldiphenyl phosphine, methylphenyl phosphine, ethyldichlorophosphine, propyldichloro phosphine, isobutyldichloro phosphine, chloromethyldichloro phosphine, dimethylbromo phosphine, dichlorophenyl phosphine, diphenylchloro phosphine, methyl dibromo phosphine, phenyldichloro phosphine, dimethylbromo phosphine, methyldichloro phosphine, diethylchloro phosphine, dibromochlorophosphine, ethylmethylchlorophosphine, 1-naphthyldichloro phosphine, dimethylvinyl phosphine, naphthyldiphenyl phosphine, 1-methylcyclotetramethylene phosphine, 1-phenylchlotetramethylene phosphine, 1-ethylpentamethylene phosphine can be employed and tertiarly phosphine is preferable.

When A is arsenic, primary, secondary and tertiarly mono- or poly arsine can be employed. Practically, methyldichloro arsine, ethyldichloro arsine, butyldichloro arsine, p-bromophenyldichloro arsine, phenyldichloro arsine, phenyldibromo arsine, phenyldiiodo arsine, dimethylchloro arsine, dimethyliodo arsine, diethylchloro arsine, diphenylchloro arsine, methyl arsine, dimethyl arsine, trimethyl arsine, ethyl arsine, diethyl arsine, triethyl arsine, triallyl arsine, tri-n-propyl arsine, phenyl arsine, p-aminophenyl arsine, benzyl arsine, p-toluyl arsine, dichloro arsine, tri-phenyl arsine, tetraethyl di-arsine, tetraphenyl di-arsine can be employed, and tertiarly arsine is preferable.

When A is antimony, primary, secondary or teriarly mono- or poly-stibine can be employed. Practically, methyldibromo stibine, methyldichloro stibine, phenyldichloro stibine, α-nappthyldichloro stibine, dimethylbromo stibine, dimethylchloro stibine, dimethyl iodo stibine, diethylbromo stibine, diisopropylbromo stibine, dibutylchloro stibine, diphenylchloro stibine, di-α-naphthyliodo stibine, methyl stibine, dimethyl stibine, trimethyl stibine, triethyl stibine, trivinyl stibine, tri-n-propyl stibine, tributyl stibine, tripentyl stibine, triphenyl stibine, trihexy stibine tridecyl stibine, tri-p-toluyl stibine, tetraethyldistibine tetraphenyl distibine can be employed and tertiarly stibine is preferable.

When A is bismuth, primary, secondary or tertiary bismuth compound can be employed. Practically, methyl bismuth dibromide, methyl bismuth dichloride, methyl bismuth diiodide, ethyl bismuth dibromide, phenyl bismuth dibromide, dimethyl bismuth chloride, diphenyl bismuth chloride, di-α-naphthyl bismuth chloride, trimethyl bismuth, triethyl bismuth, triphenyl bismuth, diphenyl-α-naphthyl bismuth, tri-α-naphthyl bismuth can be employed.

In these compound, amines, phosphines, arsines and stibines are more effective than bismuth, and amines and phosphines are most effective.

In the invention, in addition a cocatalyst compound which is an electron donor and making co-ordinate bond or interaction with basic catalyst may be used as second cocatalyst. Compounds containing row VIa or VIIa elements of the Periodic table can be employed as a second cocatalyst and the followings are typical examples of the second cocatalyst.

Straight chain or cyclic chain ethers; such as dimethyl ether, diethyl ether, diisopropyl ether, methyl phenyl ether, ethylene glycol, diethyl ether, tetra hydrofuran, halogenated hydrocarbons; such as methyl-chloride, ethylchloride, butylchloride, chlorobenzene, ethylbromide, ethyliodide, sulfides; such as dimethyl sulfide, diethyl sulfide, ethylisopropyl sulfide, dibutyl sulfide, diphenyl sulfide, ketones; such as methylesthyl ketone, diethyl ketone, aldehyde; such as formaldehyde, acetoaldehyde.

In the group of compounds shown by formula (1), particularly aluminum compounds having halogen-aluminum, oxygen-aluminum, nitrogen-aluminum or phosphorus-aluminum bond, halogenated titanium, poly-halogenated organotitaium compound, halogenated tin, polyhalogenated organostannus compound and halogenated iron have excellent catalytic effect by itself without adding cocatalyst.

Further when the cocatalyst is used with the basic catalyst, the catalytic effect increased, particularly when the basic catalyst has not had sufficient catalytic effect by itself, the effect of cocatalyst becomes remarkable and the effect of the basic catalyst and the cocatalyst sometimes becomes the same or more than the effect of basic catalyst when used solely.

The employable amount of basic catalyst or cocatalyst is not limited, however ordinarily 0.01 – 20 weight %, preferably 0.1 – 5 weight % of basic catalyst to ester of organic carboxylic acid is employed and the atom ratio of row Vb element atom contained in catalyst to number of metallic atom contained in basic catalyst is 0.05 – 10, preferably 0.2 – 5.

In practice, the basic catalyst or the basic catalyst and the cocatalyst are directly or indirectly employed in the reaction. Preferably before the reaction basic catalyst and cocatalyst are pre-treated by dehydration or dehydrocarbonation reaction between basic catalyst and cocatalyst. The state of the pre-heated basic catalyst and cocatalyst differs according to the atom ratio employed. For example when 1 mole of triethyl aluminum as a basic catalyst and less than 4 mole of diethyl amine are pre-treated, the catalytic mixture containing the covalent compounds of mono-, di- and tri(diethylamino) aluminum is obtained. When 1 mole of triethyl aluminum and more than 4 mole of diethyl amine are employed, the catalytic mixture containing co-ordinate compounds that tri-(diethylamine) aluminum is co-ordinated with diethyl amine.

Co-ordination of row $Vb$ atoms to metallic atom of M or interaction of row $Vb$ atoms and metallic atoms of M is made by mixing basic the catalyst and cocatalyst except at a ratio wherein the basic catalyst and cocatalyst make a compound. The pre-treatment of the basic catalyst and cocatalyst can be carried out in the presence or absence of an inert solvent at elevated temperature or room temperature. As an inert solvent various kind of organic solvent such as ethers, ketones and esters can be employed. For example, hexane, heptane, octane, petroleum ether, benzene, toluene, xylene, cyclohexane are preferably employed. The pre-treated catalyst can be used with the solvent or without solvent, and if necessary the pre-treated catalyst may be refined. Further when the basic catalyst and cocatalyst are directly added in reaction system of ester of organic carboxylic acid and alkylene oxide, rearrangement of the catalyst takes place during the reaction of the alkylene oxide and ester of organiccarboxylic acid. As oxygen and water have a tendency to decompose the catalyst, it is preferable that the catalyst be treated or handled in an inert atmosphere.

In using the catalyst, the catalyst can be added without any carrier or with a solid carrier such as $\alpha$-alumina and the reaction of alkylene oxide with ester of organic carboxylic acid can be carried out in liquid phase in continuous or batch system. In an even batch system, the required amount of alkylene oxide can be added all at a time or intermittently.

The mole ratio of alkylene oxide and ester of organic carboxylic is not limited and when a small mole number of alkylene oxide to be added to the ester of organic carboxylic acid is required, a low number molecular weight of alkylene oxide is employed and when a large mole number of alkylene oxide is required, a high number molecular weight of alkylene oxide is employed.

When a large amount of alkylene oxide is added to an ester of organic carboxylic acid, the alkylene oxide is preferably added intermittently in order to avoid vigorous exothermic reaction. The reaction temperature is ordinarily 50° C $\sim$ 300° C, preferably 120° C $\sim$ 200° C and the reaction can be carried out at increased pressure or at vapor pressure at the reaction temperature. Ordinarily less than 50 kg/cm² are employed and in a batch system the pressure drops according to the progress of the reaction and the pressure becomes constant when the reaction is completed.

After the reaction is completed, if desired the catalyst is decomposed with water, products can be refined by distillation of the reaction mixture. When the catalyst is solid in the reaction mixture, the reaction mixture is preferably filtered and then distillated to obtain the product and when the catalyst is dissolved in the reaction mixture, the reaction mixture is preferably distillated without filtration. Catalyst can be recycled if the reaction is carried out in appropriate atmosphere.

In this invention glycolether is not substantially produced and alkylene glycol ether ester of organic carboxylic acid is produced in high yield.

EXAMPLES 1 ~ 21

Dried ethyl acetate, ethylene oxide and catalyst were fed in a dried stainless steel autoclave having magnetic stirrer according to Table 1. Raw material and catalyst were treated under dry nitrogen gas. Reaction was started at less that 15 kg/cm² and was stopped when pressure attained equilibrium. Reaction mixture was filtered, unreacted ethyl acetate was recovered by distillation under atmospheric pressure and then the mixture was distillated under a reduced pressure to obtain desired product.

The results are listed in Table 1, in which EO-1, EO-2 and EO-3 respectively show ethyleneglycol ethylether acetate, diethyleneglycol ethylether acetate and polyethylenglycol ethylether acetate higher than triethyleneglycol ethylether acetate.

EXAMPLES 22 ~ 45

Dried ethylene acetate, ethylene oxide and catalyst were fed in a dried stainless steel autoclave shown in example 1 according to Table 2. Ethylene oxide was fed at a time and reaction was carried out at 16° C under dry nitrogen atmosphere. After pressure attained equilibrium the autoclave was cooled and about 90 % of water or enough water to decompose all catalyst was added in the reaction mixture. Precipitation of aluminum hydroxide or titanium hydroxide was filtered off, unreacted ethyl acetate was distilled off and desired product was obtained by distillation under reduced pressure.

The results are listed in Table 2, in which EO-1, EO-2 and EO-3 respectively show ethyleneglycol ethylether acetate, diethyleneglycol ethylether acetate and polyethyleneglycol ethylether acetate higher than triethyleneglycol ethylene acetate.

EXAMPLES 46 AND 47

According to example 5, ethyl acetate and propylene oxide or isobutylene oxide were reacted using catalyst of aluminum chloride and triethylamine at 160° C.

The results are listed in Table 3 in which AO-1, AO-2 and AO-3 respectively show corresponding alkyleneglycol alkylether acetate, dislykleneglycol alkylether acetate and polyalkyleneglycol ethylester acetate higher than trialkyleneglycol alkylether acetate.

EXAMPLES 48 AND 49

According to example 23, ethyl acetate and propylene oxide or isobutylene oxide were reacted using catalyst of triethoxy aluminum and triethylamine at 160° C.

The results are listed in Table 4, in which AO-1, AO-2 and AO-3 show corresponding alkyleneglycol alkylether acetate, dialkyleneglycol alkylether acetate and polyalkyleneglycol alkylether acetate higher than trialkyleneglycol alkylether acetate.

EXAMPLES 50 ~ 53

Example 5 was repeated except that ester of organic carboxylic acid and ethylene oxide were reacted according to Table 5 using catalyst of aluminum chloride and triethylamine.

The results were listed in Table 5, in which EO-1, EO-2 and EO-3 respectively show ethyleneglycol alkylether ester of organic carboxylic acid, diethyleneglycol alkylether ester of organic carboxylic acid and polyethyleneglycol alkylether ester of organic carboxylic acid higher than triethyleneglycol alkylether ester of organic carboxylic acid.

EXAMPLE 54

Example 5 was repeated except that 148.5 g of methyl laurate and 28.6 g of ethylene oxide were reacted using catalyst of 0.853 g of aluminum chloride and 0.405 g of triethylamine at 160° C for 1.5 hour. After the reaction catalyst was filtered off and unreacted methyl laurate was distilled off, 67 g of product having high boiling point was obtained. The product consisted of ethyleneglycol ethylether laurate, diethyleneglycol ethylether laurate and polyethyleneglycol ethylether laurate and average mole number of ethylene oxide adding to the laurate was 2.9

EXAMPLE 55

Example 6 was repeated except that 150 g of ethyl benzoate and 22 g of ethylene oxide was reacted using 1.90 g of aluminum chloride and 0.25 g of triethylamine at 160° C for 0.5 hour.

As a result, 32.5 g of ethyleneglycol ethylether benzoate, 10.7 g of diethyleneglycol ethylether benzoate and 11.6 g of polyethyleneglycol ethylether benzoate more than triethyleneglycol etherether benzoate were obtained.

EXAMPLE 56

Example was repeated except that 22.5 g of phenyl acetate and 13.2 g of ethylene oxide were reacted using catalyst of 1.33 g of aluminum chloride and 0.25 g of triethylamine at 140° C for 0.4 hour. As the result, 29.4 g of ethyleneglycol phenylether acetate, 11.3 g of diethyleneglycol phenylether acetate and 9.2 g of polyethyleneglycol phenylether acetate were obtained.

EXAMPLE 57

Example 6 was repeated except that 150 g of glycerol trioleate and 15 g of ethylene oxide were reacted using 1.9 g of titanium tetrachloride 0.6 g of triphenyl phosphine at 160° C for 2.0 hours. As the result, 53 g of addition product of ethylene oxide to glycerol trioleate was obtained.

EXAMPLE 58

Example 23 was repeated except that 18 g of n-butyl acetate and 16 g of ethylene oxide were reacted using catalyst of 1.3 g of triethoxy aluminum and 0.51 g of triethylamine at 160° C for 5 hour. As the result, 18.2 g of ethyleneglycol-n-butylether acetate, 4.4 g of diethyleneglycol-n-butylether acetate and 6.0 g of polyethyleneglycol-n-butylether acetate higher than triethyleneglycol-n-butyl acetate.

EXAMPLE 59

Example 32 was repeated except that 170 g of ethyl propionate and 18.3 g of ethylene oxide were reacted using catalyst of 1.6 g of triisopropoxy aluminum and 0.51 g of triethylamine at 160° C for 5 hours. As the result, 20.6 g of ethylene glycol ethylether propionate (yield was 35.9 % to ethylene oxide), 3.5 g of diethyleneglycol ethylether propionate (yield was 9.4 % to ethylene oxide) and 7.9 g of polyethyleneglycol ethylether propionate were obtained.

EXAMPLE 60

Example 23 was repeated except that 114 g of ethyl laurate and 22 g of ethylene oxide were reacted using 1.3 g of triethoxy aluminum and 0.5 g of triethylamine at 160° C for 2 hours. After filtering catalyst off and recovering ethyl laurate, 51 g of polyethyleneglycol ethylether laurate adding 3.9 mole of ethylene oxide on an average was obtained.

EXAMPLE 61 ~ 65

Example 38 was repeated except that ethylen oxide was reacted with acetic acid of synthetic higher alcohol, dimethylterephthalate, glycerol triacetate, ethyleneglycol diacetate and dodecyl acetate using catalyst of diethyl aluminum chloride and triphenylphosphine at 160° C in condition shown in Table 6. The result are shown in Table 6.

EXAMPLE 65 ~ 90

In an autoclave shown in example 1, 160 g of dried ethyl acetate, 20 g of ethylene oxide and catalyst were fed at 160° C for a period shown in Table 7. Basic catalysts (C) was prepared from aluminum compound (A) and compound (B) as shown in Table 7 according to known method. Raw material and catalyst were treated under dry sitrogen gas. After pressure of the autoclave attained equilibrium the autoclave was cooled to room temperature, unreacted ethyl acetate was distilled off at atmospheric pressure without decomposing catalyst and then dedired product was distilled under reduced pressure. The obtained product was analyzed by gas-chromatography.

The results are shown in Table 7, in which EO-1, EO-2 and EO-3 respectively show ethyleneglycol ethylether acetate, diethyleneglycol ethylether acetate and polyethyleneglycol ethylether acetate higher than triethyleneglycol ethylether acetate.

Table 1

| Example | Raw material Ester of organic carboxylic acid (ethyl acetate) | Alkylene oxide (ethylene oxide) | Catalyst (g) Basic catalyst | | Cocatalyst | | Reaction condition Temp. (C°) | Time (Hr.) | Reaction mixture (g) EO-1 | EO-2 | EO-3 |
|---|---|---|---|---|---|---|---|---|---|---|---|
| 1 | 170 | 17 | AlCl$_3$ | 1.14 | — | 0 | 160 | 6.0 | 13.2 | 3.1 | 6.7 |
| 2 | 170 | 17 | FeCl$_3$ | 3.24 | — | 0 | 170 | 8.0 | 18.0 | 8.3 | 10.1 |
| 3 | 170 | 17 | TiCl$_4$ | 1.90 | — | 0 | 160 | 4.5 | 25.5 | 8.5 | 5.6 |
| 4 | 170 | 17 | SnCl$_4$ | 5.2 | — | 0 | 170 | 9.0 | 17.2 (55.5%) | 6.2 (22.7%) | 10.5 |
| 5 | 200 | 20 | AlCl$_3$ | 1.4 | triethyl amine | 0.60 | 160 | 1.4 | 33.2 (49.8%) | 9.0 (27.8%) | 4.4 |
| 6 | 160 | 20 | TiCl$_4$ | 1.58 | triethyl amine | 0.53 | 160 | 0.5 | 29.6 | 11.0 | 5.7 |
| 7 | 170 | 17 | FeCl$_3$ | 1.30 | triethyl amine | 0.51 | 160 | 4.0 | 21.9 | 6.4 | 5.1 |
| 8 | 135 | 22.5 | AlCl$_3$ | 1.05 | pyridine | 0.37 | 160 | 3.0 | 27.9 | 9.8 | 5.7 |
| 9 | 170 | 17 | AlCl$_3$ | 1.13 | n-butyl amine | 0.39 | 160 | 5.0 | 24.8 | 6.8 | 5.2 |
| 10 | 170 | 17 | AlCl$_3$ | 1.07 | di-n-propylamine | 0.51 | 160 | 3.0 | 26.1 | 6.1 | 4.3 |
| 11 | 170 | 17 | AlCl$_3$ | 1.07 | tri-n-butylamine | 0.92 | 160 | 2.0 | 28.0 | 6.9 | 3.6 |
| 12 | 170 | 17 | AlCl$_3$ | 1.07 | n-ethyl piperidine | 0.57 | 160 | 1.5 | 25.8 | 5.3 | 4.7 |
| 13 | 170 | 17 | TiCl$_4$ | 1.52 | piperidine | 0.43 | 160 | 1.5 | 27.2 | 9.0 | 5.4 |
| 14 | 170 | 17 | TiCl$_4$ | 1.33 | N-ethylmorpheline | 0.50 | 160 | 2.0 | 28.5 | 9.2 | 3.4 |
| 15 | 160 | 20 | AlCl$_3$ | 1.33 | triphenylphosphine | 0.66 | 160 | 1.5 | 29.0 | 7.9 | 5.1 |
| 16 | 160 | 20 | AlCl$_3$ | 1.33 | triphenyl arsine | 0.67 | 170 | 4.0 | 21.5 | 6.8 | 3.3 |
| 17 | 160 | 20 | AlCl$_3$ | 1.33 | diphenylchloro phosphine | 0.63 | 170 | 4.0 | 21.5 | 6.8 | 3.3 |
| 18 | 160 | 20 | TiCl$_4$ | 1.90 | triphenyl phosphine | 0.66 | 160 | 0.7 | 28.6 | 10.1 | 4.5 |
| 19 | 160 | 20 | TiCl$_4$ | 1.90 | triphenyl arsine | 0.67 | 170 | 1.5 | 26.1 | 8.7 | 5.1 |
| 20 | 160 | 20 | FeCl$_3$ | 1.62 | tributylphosphine | 0.40 | 160 | 5.0 | 20.0 | 5.8 | 5.1 |
| 21 | 160 | 20 | SnCl$_4$ | 2.60 | triphenylphosphine | 0.66 | 170 | 5.0 | 22.2 | 6.3 | 4.3 |

Note:
(%) shows yield to ethylene oxide.

Table 2

| Example | Raw material (g) ethyl acetate | ethyl oxide | Catalyst (g) Basic catalyst | | Cocatalyst | | Reaction Condition Temp. (C°) | Time (Hr.) | Reaction mixture (g) EO-1 | EO-2 | EO-3 |
|---|---|---|---|---|---|---|---|---|---|---|---|
| 22 | 170 | 17 | Al(OEt)$_3$ | 1.30 | — | 0 | 160 | 6.0 | 15.1 (52.5) | 3.7 (18.1) | 6.0 |
| 23 | 170 | 17 | Al(OEt)$_3$ | 1.30 | triethyl amine | 0.51 | 160 | 2.5 | 25.2 | 5.8 | 5.7 |
| 24 | 170 | 17 | Al(OEt)$_3$ | 1.40 | triethyl amine | 0.31 | 160 | 4.0 | 22.8 | 6.2 | 5.8 |
| 25 | 170 | 17 | Al(OEt)$_3$ | 1.50 | tri-n-propylamine | 0.76 | 160 | 3.0 | 27.1 | 5.8 | 5.2 |
| 26 | 170 | 17 | Al(OEt)$_3$ | 1.40 | diethylamine | 0.39 | 160 | 4.0 | 24.6 | 6.8 | 4.4 |
| 27 | 170 | 17 | Al(OEt)$_3$ | 1.40 | piperidine | 0.45 | 160 | 5.0 | 21.8 | 5.2 | 5.1 |
| 28 | 170 | 17 | Al(OEt)$_3$ | 1.40 | quinuclidine | 0.52 | 160 | 3.5 | 22.2 | 7.0 | 5.1 |
| 29 | 170 | 17 | Al(OEt)$_3$ | 1.40 | triethylenediamine | 0.28 | 160 | 5.0 | 25.4 | 5.8 | 4.9 |
| 30 | 170 | 17 | Al(OEt)$_3$ | 1.40 | N,N-diethylamine | 0.60 | 160 | 5.0 | 18.7 | 3.1 | 6.0 |
| 31 | 170 | 17 | Al(O-iPr)$_3$ | 1.63 | — | 0 | 160 | 6.0 | 18.0 (56.4) | 4.0 (20.0) | 6.0 |
| 32 | 170 | 17 | Al(O-iPr)$_3$ | 1.63 | triethylamine | 0.51 | 160 | 2.0 | 27.4 | 6.5 | 3.9 |
| 33 | 170 | 17 | Al(O-nBu)$_3$ | 1.70 | triethylamine | 0.44 | 160 | 5.0 | 25.6 | 5.7 | 4.4 |
| 34 | 150 | 25 | AlEt$_3$ | 1.14 | triethylamine | 0.25 | 160 | 1.0 | 31.3 | 12.6 | 5.5 |
| 35 | 150 | 25 | AlEt$_3$ | 1.14 | diethyl amine | 0.37 | 160 | 0.5 | 30.6 | 12.2 | 6.4 |
| 37 | 160 | 20 | Et$_2$AlCl | 1.21 | — | 0 | 160 | 2.5 | 25.6 | 6.2 | 4.3 |
| 38 | 160 | 20 | Et$_2$AlCl | 1.21 | triethylamine | 0.25 | 160 | 0.5 | 28.4 | 9.5 | 6.1 |
| 39 | 160 | 20 | Et$_3$Al$_2$Cl$_3$ | 1.30 | triethylamine | 0.25 | 160 | 0.5 | 29.1 | 5.7 | 8.6 |
| 40 | 160 | 20 | Et$_2$AlCl | 1.21 | triphenylphosphine | 0.26 | 160 | 0.6 | 28.7 | 6.0 | 6.2 |
| 41 | 160 | 20 | (n-BuO)$_3$TiCl | 3.03 | triethyl amine | 0.25 | 160 | 4.0 | 21.3 | 4.7 | 4.1 |
| 42 | 160 | 20 | (n-BuO)$_2$TiCl$_2$ | 2.65 | triethyl amine | 0.25 | 160 | 1.0 | 29.7 | 8.2 | 4.8 |
| 43 | 160 | 20 | (n-BuO)$_2$TiCl | 3.03 | — | 0 | 160 | 7.0 | 21.7 | 6.0 | 8.0 |
| 44 | 160 | 20 | (n-BuO)$_2$TiCl$_2$ | 2.65 | — | 0 | 160 | 3.0 | 28.0 | 7.5 | 8.5 |
| 45 | 160 | 20 | (n-BuO)$_2$TiCl$_2$ | 2.65 | tributylphosphine | 0.26 | 160 | 1.3 | 30.3 | 11.0 | 5.7 |
| 45' | 160 | 20 | ZnEt$_2$ | 1.24 | triethyl amine | 0.51 | 160 | 4.0 | 20.5 | 7.7 | 6.4 |
| 45'' | 160 | 20 | ZnEt$_2$ | 1.24 | triphenylphosphine | 1.31 | 160 | 4.0 | 19.6 | 7.3 | 6.1 |

Note:
(%) shows yield to ethylene oxide each of Et, i pr and Bu represent ethyl, isopropyl and butyl groups in order.

Table 3

| Example | Raw material (g) Ethylacetate | Alkylene oxide | Catalyst AlCl$_3$ | Triethylamine | Reaction, Condition Temp. (C°) | Time (hr) | Reaction mixture (g) AO-1 | AO-2 | AO-3 |
|---|---|---|---|---|---|---|---|---|---|
| 46 | 160 | propylene oxide 21 | 1.07 | 0.51 | 160 | 5.0 | 29.2 | 4.6 | 3.3 |
| 47 | 160 | isobutylene oxide 26 | 1.07 | 0.51 | 160 | 10.0 | 22.8 | 5.4 | 3.6 |

Table 4

| Example | Raw material (g) ethylacetate | alkylene oxide | Catalyst triethoxy Al | triethylamine | Reaction, Condition Temp. (C°) | Time (Hr.) | Reaction mixture (g) AO-1 | AO-2 | AO-3 |
|---|---|---|---|---|---|---|---|---|---|
| 48 | 160 | propylene oxide 21 | 1.94 | 0.76 | 160 | 4.0 | 38.9 | 3.6 | 2.6 |
| 49 | 160 | isobutylene oxide 26 | 1.94 | 0.76 | " | 6.0 | 33.9 | 2.4 | 2.7 |

Table 5

| Example | Raw material(g) ester of organic carboxylic acid | ethyl oxide | Catalyst AlCl₃ | triethyl amine | Reaction, Condition Temp. (C°) | Time (hr.) | Reaction mixture (g) Ao-1 | AO-2 | AO-3 |
|---|---|---|---|---|---|---|---|---|---|
| 50 | ethyl formate 170 | 20 | 1.07 | 0.51 | 160 | 4.0 | 24.5 | 8.3 | 4.4 |
| 51 | ethyl acetate 170 | 20 | 1.07 | 0.51 | 160 | 5.0 | 25.0 | 5.0 | 6.4 |
| 52 | n-butyl acetate 170 | 16 | 1.07 | 0.51 | 160 | 2.5 | 19.2 | 8.0 | 4.9 |
| 53 | ethyl propionate 170 | 18 | 1.07 | 0.51 | 160 | 3.0 | 24.3 | 8.1 | 6.3 |

Table 6

| Example | Raw materials(g) ester of organic carboxylic acid | ethylene oxide | Catalyst basic catalyst (g) | cocatalyst (g) | time for reaction (hr) | Products (g) |
|---|---|---|---|---|---|---|
| 61 | polyal acetate (94) | 22 | Et₂AlCl (1.21) | triphenylphosphine (1.31) | 1.0 | ethylene glycol, diethylene glycol and polyethyleneglycol higher alkylene ether acetate (116) |
| 62 | dimethyl terephthalate (97) | 44 | Et₂AlCl (1.21) | triphenylphosphine (1.31) | 1.0 | methyl (β-methoxyethyl)phthalate, bis-(β-methoxyethl)phthalate and bis-(β-methoxy-β-ethoxyethyl) phthalate (77) |
| 63 | glycerol triacetate (109) | 22 | Al(OEt)₃ | triethyl amine (0.70) | 3.2 | tris(β-acetoxyethyl)glyceride and higher glyceride (41) |
| 64 | ethyleneglycol (146) | 44 | Al(OEt)₃ | triethyl amine (0.50) | 2.0 | diethylene glycol diacetate and polyethylene glyceldiacetate (83) |
| 65 | dodecylacetate (114) | 22 | (n-BuO)₂TiCl₂ | triethyl amine (0.25) | 4.0 | ethylene glycol, diethylene glycol or polydodecyl ether acetate (59) |

Note:
Et and Bu show respectively ethyl and butyl group.

Table 7

| Example | Catalyst A | Basic catalyst B | C | | Cocatalyst | | Reaction hours (160° C) | Product EO-1 | EO-2 | EO-3 |
|---|---|---|---|---|---|---|---|---|---|---|
| 66 | AlEt₃ | diethylamine | Al(NEt₂)₃ | 2.4 | triethylamine | 0.25 | 4.0 | 24.5 | 7.1 | 4.1 |
| 67 | AlEt₃ | N-ethylaniline | Al(N(Et)(C₆H₅))₃ | 3.9 | triethylamine | 0.25 | 5.5 | 21.1 | 3.5 | 2.8 |
| 68 | AlEt₃ | phenylmercaptan | Al(S—C₆H₅)₃ | 3.5 | tributylphosphine | 1.00 | 5.5 | 20.0 | 3.0 | 3.0 |
| 69 | AlEt₃ | diphenylphosphine | Al(P(C₆H₅)₂)₃ | 3.5 | triethyl amine | 0.25 | 1.5 | 28.2 | 9.3 | 4.5 |
| 70 | Et₂AlCl | ethanole | (EtO)₂AlCl | 1.5 | — | 0 | 2.0 | 27.3 | 8.6 | 6.2 |
| 71 | Et₂AlCl | diethylamine | (Et₂N)₂AlCl | 2.1 | diethylamine | 0.25 | 2.0 | 28.9 | 8.8 | 6.6 |
| 72 | Et₂AlCl | phenylmercaptan | (C₆H₅S)₂AlCl | 2.8 | triethylamine | 0.25 | 3.5 | 24.2 | 7.3 | 5.4 |
| 73 | Et₂AlCl | phenylphosphine | (C₆H₅(H)P)₂AlCl | 2.8 | — | — | 1.0 | 29.7 | 10.1 | 4.5 |
| 74 | AlEt₃ | ethanole | EtAl(OEt)₂ | 1.5 | triphenylamine | 0.25 | 1.5 | 27.9 | 9.3 | 6.8 |
| 75 | AlEt₃ | ethanole | Et₂Al(OEt) | 1.3 | triphenylamine | 1.50 | 5.0 | 20.0 | 3.5 | 2.6 |
| 76 | AlEt₃ | phenole | Et₂Al(OC₆H₅) | 1.8 | triethylamine | 0.25 | 1.0 | 29.4 | 8.7 | 7.1 |

Table 7-continued

| Example | Catalyst Basic catalyst A | B | C | Cocatalyst | | Reaction hours (160° C) | Product EO-1 | EO-2 | EO-3 |
|---|---|---|---|---|---|---|---|---|---|
| 77 | AlEt$_3$ | diethylamine | Et$_2$Al(NEt$_2$) | — | 1.6 | 0 | 0.6 | 29.1 | 11.0 | 6.0 |
| 78 | AlEt$_3$ | ethylmercaptan | Et$_2$Al(SEt) | triethylamine | 1.5 | 0.25 | 2.0 | 28.1 | 6.5 | 5.4 |
| 79 | AlEt$_3$ | phenylmercaptan | Et$_2$Al(SC$_6$H$_5$) | triphenylphosphine | 1.9 | 0.80 | 2.0 | 27.6 | 7.7 | 5.4 |
| 80 | AlEt$_3$ | diphenylphosphine | Et$_2$Al(P(C$_6$H$_5$)$_2$) | — | 1.9 | 0 | 1.5 | 29.9 | 10.2 | 9.4 |
| 81 | AlEt$_3$ | aniline | Et$_2$Al(N(H)(C$_6$H$_5$)) | triethylamine | 1.8 | 0.25 | 4.0 | 23.8 | 5.4 | 4.2 |
| 82 | EtAl(OEt)$_2$ | diethylamine | (Et$_2$N)Al(OEt)$_2$ | — | 1.9 | 0 | 1.0 | 28.7 | 9.1 | 10.3 |
| 83 | EtAl(OEt)$_2$ | phenylphosphine | (H(C$_6$H$_5$)P)Al(OEt)$_2$ | — | 2.3 | 0 | 1.5 | 28.9 | 9.4 | 6.3 |
| 84 | EtAl(OEt)$_2$ | ethylmercaptan | (EtS)Al(OEt)$_2$ | triethylamine | 1.8 | 0.25 | 2.5 | 27.4 | 6.8 | 5.6 |
| 85 | Et$_2$Al(OEt) | diethylamine | EtAl(OEt)(NEt$_2$) | — | 1.7 | 0 | 2.0 | 28.4 | 9.1 | 9.7 |
| 86 | Et$_2$AlCl | ethanole | EtAl(OEt)Cl | triethylamine | 1.3 | 0.25 | 1.5 | 28.1 | 7.2 | 4.5 |
| 87 | Et$_4$Sn | tin tetrachloride | Et SnCl$_3$ | — | 2.5 | 0 | 5.0 | 22.2 | 4.1 | 5.0 |
| 88 | Et$_4$Sn | tin tetrachloride | Et$_2$SnCl$_2$ | triethylamine | 2.5 | 0.25 | 5.5 | 23.6 | 6.2 | 3.1 |
| 89 | Et$_4$Sn | tin tetrachloride | Et$_2$SnBr$_2$ | tributylphosphine | 3.4 | 1.00 | 6.0 | 23.8 | 4.7 | 3.6 |
| 90 | AlEt$_3$ | morpholine | EtAl(N(CH$_2$CH$_2$)$_2$O)$_2$ | — | 2.1 | 0 | 1.5 | 28.3 | 9.3 | 6.5 |

Note:
Et shows ethyl group.

We claim:

1. A process for the production of an alkylene glycol ether ester of an organic acid which comprises the step of reacting an alkylene glycol ether with an organic carboxylic acid ester in accordance with the following reaction equation:

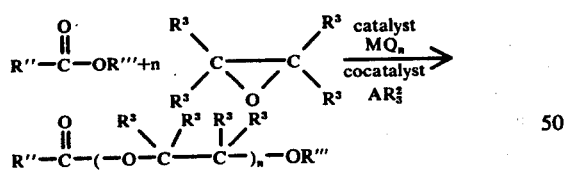

wherein

R″ is a substituted or non-substituted hydrocarbon having 1 to 20 carbon atoms or a hydrogen atom;

R‴ is a substituted or non-substituted hydrocarbon having 1 to 20 carbon atoms;

R$^3$ are each the same or different substituted or non-substituted hydrocarbon having 1 to 10 carbon atoms or a hydrogen atom;

MQ$_n$ is a basic catalyst wherein M is a metallic atom selected from the group consisting of Zn, Al, Ti, Sn and Fe, n is an integer corresponding to the valency of M, when M is Al or Sn, Q is simultaneously the same or different groups X, R, OR, SR, NR$_2$ or PR$_2$, when M is Zn or Ti, Q is simultaneously the same or different groups X, R or OR, and when M is Fe, Q is X, and wherein X is a halogen atom selected from the group consisting of Cl, Br and I, and R is the same or different substituted or non-substituted hydrocarbon having 1 to 20 carbon atoms or a hydrogen atom; and AR$_3^2$ is a cocatalyst wherein A is nitrogen, phosphorus, antimony, arsenic or bismuth, R$^2$ is the same or different atoms or groups of halogens, hydrogen or substituted on non-substituted hydrocarbon groups having 1 to 20 carbon atoms wherein two of R$^2$ may form a cyclic hydrocarbon and at least one of R$^2$ is a hydrocarbon.

2. The process as claimed in claim 1, wherein said cocatalyst is a compound selected from the group consisting of amines phosphines, arsines and stibines.

3. A process for the production of an alkylene glycol ether ester of an organic acid which comprises the step of reacting an alkylene oxide with an ester of organic carboxylic acid in accordance with the following reaction equation:

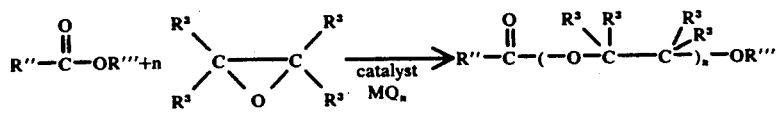

wherein
- R'' is a substituted or non-substituted hydrocarbon having from 1 to 20 carbon atoms or a hydrogen atom;
- R''' is a substituted or non-substituted hydrocarbon having 1 to 20 carbon atoms;
- $R^3$ are each the same or different substituted or non-substituted hydrocarbon having 1 to 10 carbon atoms or a hydrogen atom; and
- $MQ_n$ is a catalyst wherein M is a metallic atom selected from the group consisting of Zn, Ti, Sn and Fe; $n$ is an integer corresponding to the valency of M; when M is Zn or Ti, Q is simultaneously the same or different groups X, R or OR; when M is Sn, Q is simultaneously the same or different groups X, R, OR, SR, $NR_2$ or $PR_2$; and when M is Fe, Q is X wherein X is a halogen atom selected from the group consisting of Cl, Br and I, and R is the same or different substituted or non-substituted hydrocarbon group having 1 to 20 carbon atoms or a hydrogen atom.

* * * * *

UNITED STATES PATENT OFFICE
CERTIFICATE OF CORRECTION

Patent No. 4,022,808      Dated May 10, 1977

Inventor(s) Hiroshi Yoshihara, Takashi Tobita, Ryoichi Tomizawa, Kunio Ishikawa

It is certified that error appears in the above-identified patent and that said Letters Patent are hereby corrected as shown below:

| COLUMN | LINE | NOW READS | CORRECT TO READ |
|---|---|---|---|
| Title of first page & column 1 | | Ether | Ether Ester |
| 1st pg., Assignee | | Nippon Soda | Nisso Petrochemical Industries |
| 1st pg., Abstract | 2 | organic acid | organic carboxylic acid |
| 1 | 33 | alkyl ester | mono-alky ether |
| 1 | 56-57 | alkylene glycol ether ester | ester |
| 2 | 2 | arsenic antimony | arsenic, antimony |
| 2 | 4 | carboxylic | carboxylic acid |
| 2 | 30 | stylene | styrene |
| 2 | 49-50 | valeriate | valerate |
| 2 | 54 | cyclohexacarboxylate | cyclohexanecarboxylate |
| 3 | 23 | MQN | MQn |
| 4 | 18-19 | triethyory | triethoxy |

UNITED STATES PATENT OFFICE
CERTIFICATE OF CORRECTION

Patent No. 4,022,808  Dated May 10, 1977

Inventor(s) Hiroshi Yoshihara, Takashi Tobita, Ryoichi Tomizawa, Kunio Ishikawa

It is certified that error appears in the above-identified patent and that said Letters Patent are hereby corrected as shown below:

| COLUMN | LINE | NOW READS | CORRECT TO READ |
|---|---|---|---|
| 4 | 63-64 | laurylamino dichloride | laurylamino aluminum dichloride |
| 5 | 3 | cyclohexyamide | cyclohexylamide |
| 5 | 19 | reacing | reacting |
| 5 | 20 | mertaptane | mercaptane |
| 5 | 21 | Q is R and $PR_2$) | (Q is R and $PR_2$) |
| 6 | 11 | aluminumhalogen | aluminum-halogen |
| 6 | 66-67 | dimethyl tin chloride | dimethyl tin dichloride |
| 7 | 30-39 | Vh | Vb |
| 10 | 7 | carboxylic | carboxylic acid |
| 10 | 9-10 | low number molecular weight | small mole number |
| 10 | 11-12 | high number molecular weight | large mole number |
| 10 | 51-52 | triethyleneglycol | diethyleneglycol |
| 10 | 58 | 16°C | 160°C |

UNITED STATES PATENT OFFICE
CERTIFICATE OF CORRECTION

Patent No. 4,022,808      Dated May 10, 1977

Inventor(s) Hiroshi Yoshihara, Takashi Tobita, Ryoichi Tomizawa, Kunio Ishikawa

It is certified that error appears in the above-identified patent and that said Letters Patent are hereby corrected as shown below:

| COLUMN | LINE | NOW READS | CORRECT TO READ |
|---|---|---|---|
| 11 | 2-3 | triethyleneglycol | diethyleneglycol |
| 11 | 3 | ethylene | ethylether |
| 11 | 11 | dislykleneglycol | dialkyleneglycol |
| 11 | 12 | ethylester | alkylether |
| 11 | 13 | trialkyleneglycol | dialkyleneglycol |
| 11 | 35 | trialkyleneglycol | dialkyleneglycol |
| 12 | 17-18 | triethyleneglycol-n-butyl acetate | diethyleneglycol-n-butyl ether acetate |
| 12 | 50 | 65 | 66 |
| 12 | 58 | sitrogen | nitrogen |
| 12 | 69 | triethyleneglycol | diethyleneglycol |
| Table 2, Example 30 | | N,N-diethylamine | N,N-diethylamine 0.60 |

UNITED STATES PATENT OFFICE
CERTIFICATE OF CORRECTION

Patent No. 4,022,808  Dated May 10, 1977

Inventor(s) Hiroshi Yoshihara, Takashi Tobita, Ryoichi Tomizawa, Kunio Ishikawa

It is certified that error appears in the above-identified patent and that said Letters Patent are hereby corrected as shown below:

| COLUMN | LINE | NOW READS | CORRECT TO READ |
|---|---|---|---|
| Table 2, Example 30 | | 160 5.0 18.7 3.0 6.0 | 0.60 160 5.0 18.7 3.1 6.0 |
| Table 5 | | ethyl oxide | ethylene oxide |
| Table 6 | | ethyleneglycol | ethyleneglycol diacetate |
| 17 | 41 | organic acid | organic carboxylic acid |
| 17 | 42 | glycol ether | oxide |
| 18 | 52 | on | or |
| 18 | 57 | amines phosphines | amines, phosphines |
| 18 | 59 | organic acid | organic carboxylic acid |

Signed and Sealed this

Thirteenth Day of December 1977

[SEAL]

Attest:

RUTH C. MASON
Attesting Officer

LUTRELLE F. PARKER
Acting Commissioner of Patents and Trademarks